United States Patent

Thurlow

Patent Number: 5,308,272
Date of Patent: May 3, 1994

[54] ASCENT RATE INDICATOR

[76] Inventor: Mark Thurlow, 173 Copper Ave., Vista, Calif. 92083

[21] Appl. No.: 905,439

[22] Filed: Jun. 29, 1992

[51] Int. Cl.$^5$ ............................................. G01F 23/14
[52] U.S. Cl. ...................... 441/88; 441/136; 73/865.1; 405/186
[58] Field of Search .................. 441/88; 405/185, 186; 73/1 E, 865.1, 304 C, 649, 724; 33/1 PT, 1 M, 1 N, 365, 366, 367, 377

[56] References Cited

U.S. PATENT DOCUMENTS

| | | | |
|---|---|---|---|
| 3,696,610 | 10/1972 | Charbonnier | 73/865.1 |
| 4,327,584 | 5/1982 | Alinari | 73/865.1 |
| 4,350,042 | 8/1982 | MacGregor | 73/865.1 |
| 4,583,484 | 4/1986 | Freund | 73/865.1 |
| 4,589,283 | 5/1986 | Morrison | 73/865.1 |
| 4,810,134 | 3/1989 | Eaulconer et al. | 441/88 |
| 4,889,511 | 12/1989 | Herman | 441/88 |

Primary Examiner—Jesus D. Sotelo
Assistant Examiner—Stephen P. Avila
Attorney, Agent, or Firm—Lewis E. Massie

[57] ABSTRACT

A non-mechanical ascent rate indicator for use in saltwater scuba diving. A high density sphere attached by means of a ball chain tether to the gauge, or hose, of a scuba diver has a free rate of ascent of less than 60 feet/minute, the difference in this rate and that of the diver will be shown by the amount to free loop in the tether as it is observed on a horizontal plane even to the diver's eyes. A safe ascent rate will provide a loop of approximately 1 to 1½ inch.

1 Claim, 1 Drawing Sheet

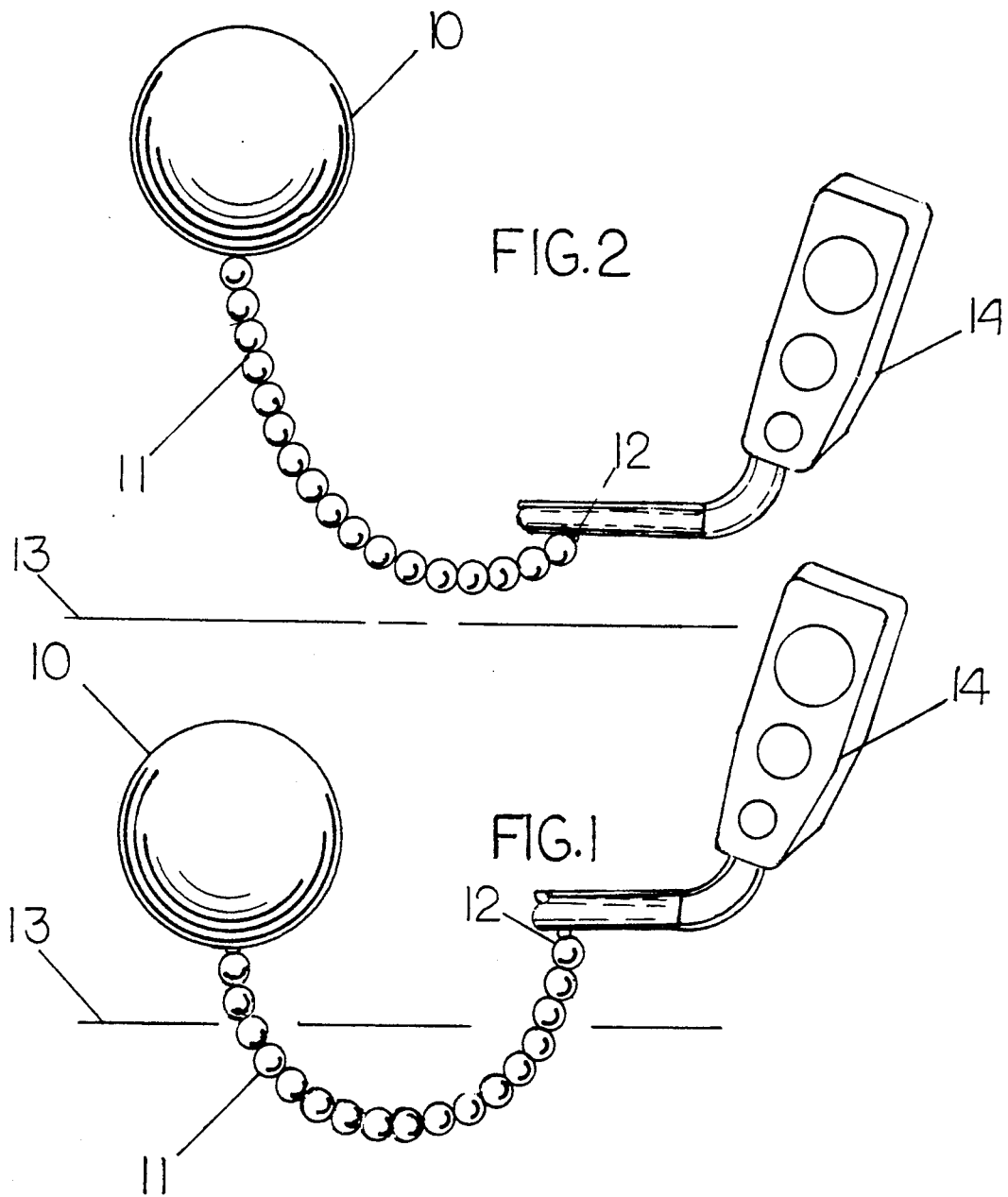

ASCENT RATE INDICATOR

BACKGROUND OF THE INVENTION

1. Field of the Invention

Decompression sickness, or "the bends" caused by increased environmental pressure is commonly seen in divers using scuba (self-contained underwater breathing apparatus).

Divers using scuba gear must control their rate of ascent towards the surface to avoid the bends. A device to indicate the rate of ascent is needed, the instant invention discloses a simple device that indicates the rate of a diver's ascent.

2. Description of the Related Art

U.S. Pat. No. 3,121,333 issued to Alinari in 1964 describes an indicating instrument for divers that accurately indicates the decompression stoppages as a function of the immersion accomplished. The instrument comprises a bellows subject to the hydrostatic pressure from the liquid in which it is immersed coupled to a pressure gage for measuring the instantaneous pressure. U.S. Pat. No. 4,820,953 issued to Sauballe et al in 1989, describes a rate of ascent monitor for divers that uses a sound transducer with velocity characteristics to sense a rate of pressure changes.

SUMMARY OF THE INVENTION

A high density sphere less than one inch in diameter is attached by means of a ball chain to the diver's equipment on the horizontal plane created by the line from the site of attachment as the unit held at approximately the diver's eye level. Under ideal conditions the unit is attached to the diver's gauges and as the diver ascends, a one-half to one inch loop of the ball chain tether hangs vertically below the horizontal plane created by the line from the site of attachment of the unit held at approximately the diver's eye level. The diver then regulates his rate of ascent to maintain this loop. If the rate of ascent increases, the amount of tether chain below the horizontal line increases until the unit begins to drag when the ascent rate exceeds 60 ft/min (the current accepted maximum rate). As ascent rate decreases to less than 30 ft/min, the amount of chain decreases until the tether chain becomes completely vertical at an ascent rate of 10 ft/min.

BRIEF DESCRIPTION OF THE DRAWINGS

FIG. 1 shows the tether ball chain loop indicating an ascent rate of approximately 45 ft/min.

FIG. 2 shows the tether ball chain loop indicating an ascent rate of approximately 30 ft/min.

DETAILED DESCRIPTION OF THE PREFERRED EMBODIMENTS

FIGS. 1 and 2 show the high density sphere (10), the ball chain tether (11), the tether attachment point (12) and the horizontal plane of the driver's eyes (13).

The operation of the ascent rate indicator is based on Archimedes' Principle which states that "a body wholly or partially submerged in a fluid is buoyed up by a force equal to the weight of the displaced fluid". The buoyant force depends on the density of the fluid and the volume of the body but not on the composition or shape of the body. The forces acting on the object are as follows:

F1—force acting downward due to the fluid pressing on the top surface of the object;

F2—force acting upward due to the fluid pressing on the bottom surface of the object;

B (Buoyant force)=F2−F1

If an object has a small surface area, the pressure that the fluid exerts on the object is independent of the surface area but directly proportional to the force (P=F/A; when A→O, P=F).

A high density sphere with tether serves as the indicator when attached to a diver's equipment. The sphere is made of a material that is solid, water-, pressure-, and corrosion-resistant, and has a density of less than 1.00 g/cm$^3$. The diameter of the test model sphere was approximately 0.844 inches. Therefore, the small surface area will result in negligible resistance at the velocities used (less than 60 ft/min). In addition, due to its spherical shape and small surface area, the effect of currents and surge will be minimal and negated by the more significant effect of current and surge on the diver. The relative effect of current on the device with respect to the diver to whom it is attached will be negligible. Under field conditions, the resistance to movement through the water column has been empirically determined with the test model.

Since the buoyant force equals the weight of the fluid displaced by the volume of the object, the buoyant force depends on the density of the fluid. The density of saltwater is approximately 64.0 lbs/ft$^3$ and exerts a force of 0.445 psi. The narrow range of salinity (3.2–3.6 g salt/liter of water) does not affect the density of saltwater enough to be detected by a measurable difference in ascent rate of the unit. The narrow range of water temperatures and negligible thermal expansion coefficient of the indicator material also have a minimal effect on the range of ascent rates. Since all materials used in the ascent rate indicator are solid, the effects of water pressure on buoyancy are negligible due to minimal compression.

The operation of the ascent rate indicator depends on the use of a tether that is water- pressure-, and corrosion-resistant and is made of a material with a density greater than 1.00 g/cm$^3$. The material chosen for the test model was aluminum ball chain (#3: diameter 3/32 inches). The tether serves to partially counteract the buoyant forces of the sphere and also provides a visual indicator. Due to the range in sphere material densities, the aluminum ball chain can be used to calibrate each unit. Empirical determinations made under field conditions have demonstrated the range of ascent rates with this unit to be between 10 and 60 ft/min. Since the current accepted standard in the diving industry is an ascent rate no faster than 60 ft/min, this device will assure an ascent rate no faster than the maximum allowable rate. The model units are calibrated so that the diver ascends at approximately 30 ft/min. Under ideal conditions, the unit is attached to the diver's gauges or hose and the diver ascends so that a ½–1 inch loop of chain hangs vertically below the horizontal plane created by the line from the site of attachment of the unit held at approximately the diver's eye level. The diver then keeps pace with the sphere to maintain this loop. If the diver ascends more rapidly, the amount of chain below the horizontal line increases until the diver begins to drag the unit when ascending faster than 60 ft/min. If the diver ascends more slowly than 30 ft/min, the amount of chain below the horizontal plane decreases until the tether becomes completely vertical at approximately 10 ft/min ascent rate. Due to variabilities in diving conditions and skills, an acceptable range of ascent rates is used rather than one specific rate.

I claim:

1. An ascent rate indicator using a high density sphere attached to a ball chain tether attached to a diver's gauges, or hose, whereby the relative rate of ascent is indicated by the vertical position of the sphere wherein the improvements comprise:
   (a), the sphere of less than one inch in diameter made from a corrosion and pressure resistant material;
   (b), the sphere having a density less than 1.00 grams/centimeter cubed;
   (c), the sphere attached to a flexible ball chain tether made from a corrosion, and pressure resistant material;
   (d), the mass of the tether serving as a partial counterweight to the buoyant forces of the sphere;
   (e), the end of said tether attachable to the scuba diver's hose or equipment on a horizontal plane level with the diver's eyes; and,
   (f), the ascent rate of the sphere compared to the ascent rate of the diver is indicated by the relative position of the sphere to the place of attachment of the ball chain tether on the diver's equipment.

* * * * *